Figure 1:
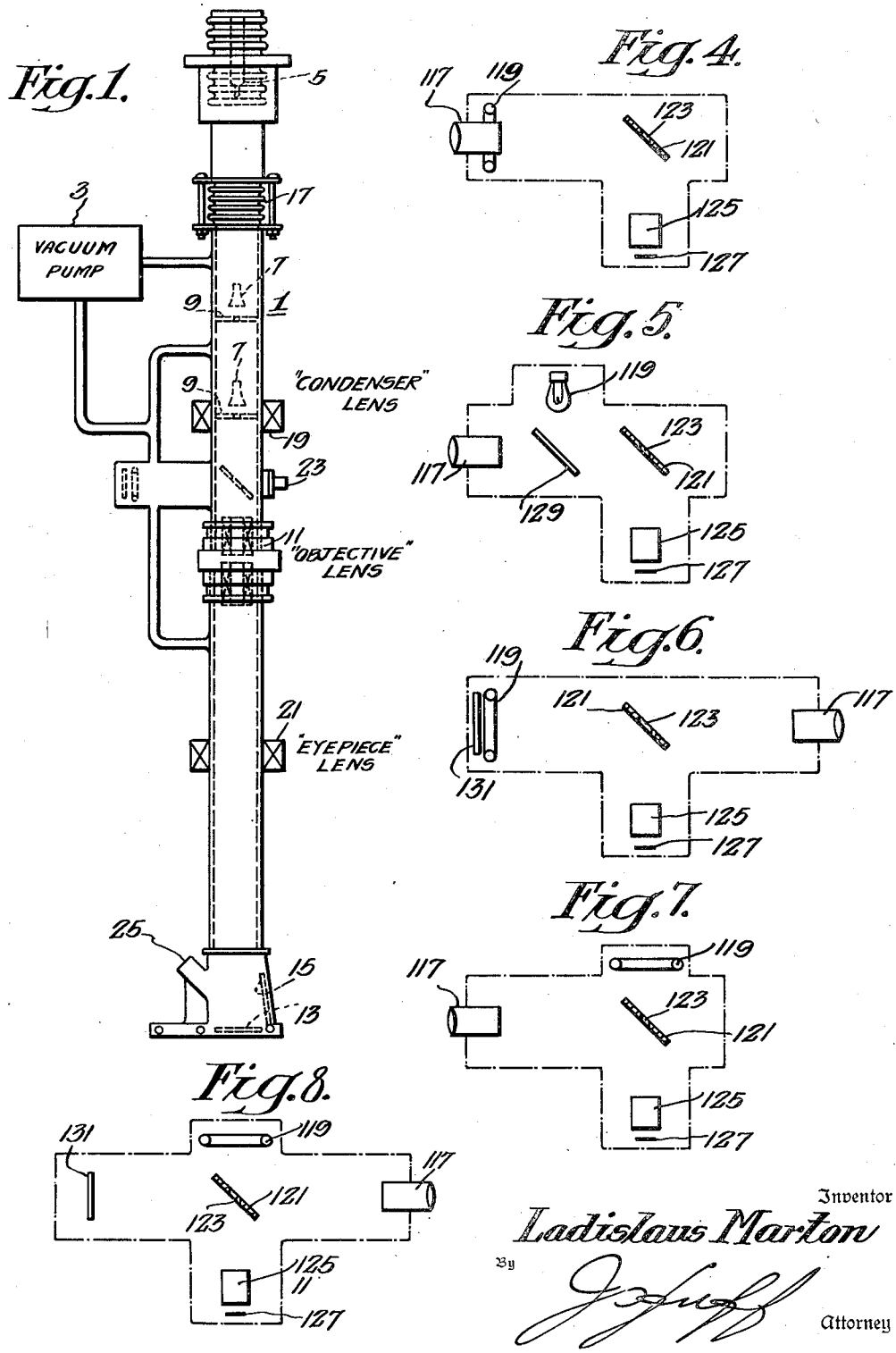

Feb. 25, 1941. L. MARTON 2,233,286
ELECTRONIC AND LIGHT MICROSCOPE
Filed Jan. 27, 1939 2 Sheets-Sheet 2
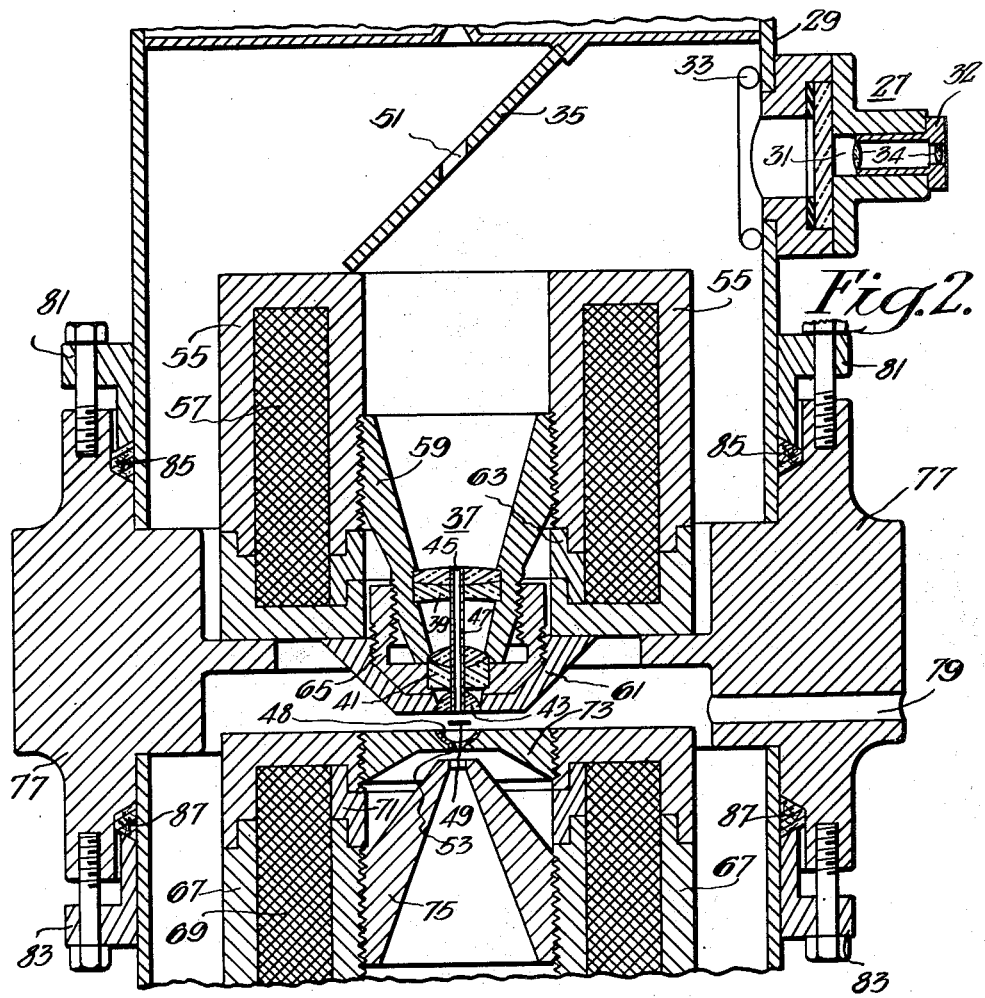
Fig.2.
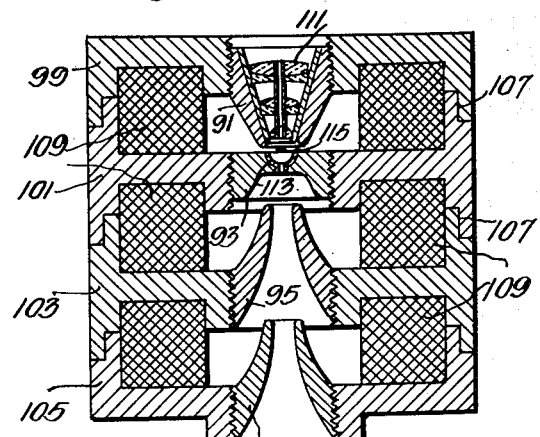
Fig.3.
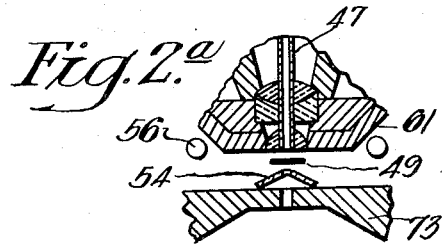
Fig.2.ᵃ
Inventor
Ladislaus Marton
Attorney Patented Feb. 25, 1941

2,233,286

UNITED STATES PATENT OFFICE 2,233,286

ELECTRONIC AND LIGHT MICROSCOPE

Ladislaus Marton, Collingswood, N. J., assignor to Radio Corporation of America, a corporation of Delaware Application January 27, 1939, Serial No. 253,029

7 Claims. (Cl. 250—160)

This invention relates to electronic and light microscopes and more especially to a novel arrangement in which the light lenses and the electronic lenses are combined.

When biological specimens are examined by means of an electron microscope, the specimens are bombarded electronically. This bombardment, if sufficiently prolonged and if sufficiently intense, will modify the structure of the specimen. It is therefore desirable, in many instances, to be able to examine the specimen by light means. The attempt to include both types of microscope within a single device may lead to complication. For example, Knecht attempted to arrange an electric lens and a light lens so that either could be moved into operable position while the other was removed. L. C. Martin describes a microscope in which one part forms the electronic system and another the light system. The specimen is arranged on a turntable or arm so that it may be moved into the field of either system. Both of these proposals involve movable parts, and very high precision of adjustment is required for viewing alternately exactly the same portion of a specimen. The adjustment required is so microscopic that attainment in practice is almost impossible. Furthermore, such proposals are limited to alternate light and electronic observations.

The utility of combining electronic and light microscopes will be highly appreciated by those who will correlate the information previously acquired by light microscopes and information obtainable by the newly developed electronic microscopes, which magnify ten to twenty times more than the best light microscopes. This correlation may be best accomplished by viewing by the two means simultaneously the same portions of a specimen at the same depth of focus. Further, as indicated, electronic bombardment may modify the structure of the specimen; therefore, previewing by a light microscope makes it possible to first obtain the required light view of the interesting portions, and then obtain the electronic image. Finally, the nature of the modification may be indicated by simultaneous electronic and light photomicrographs.

It is, therefore, one of the objects of this invention to provide a simple means for combining the electronic and light microscopes in a single instrument. Another object is to provide means for combining electronic and light lenses. An additional object is to provide means whereby substantially the same portion of the specimen may be examined either by light or electronic means. A further object is to provide means for viewing the same portion of a specimen at the same depth of focus by electronic and light means operated simultaneously or independently. A further object of the invention is to provide a passageway through a light lens whereby electrons may be passed through the lens system. A still further object is to provide novel means for concentrating light on a specimen.

The invention will be described by reference to the accompanying drawings, in which Figure 1 is an elevational view of one embodiment of an electronic and light microscope; Figure 2 is a sectional view of a combined electronic and light lens; Figure 2a is a sectional view of a modified portion of Figure 2; Figure 3 is a sectional view of a modified type of combined light and electronic lens; and Figures 4, 5, 6, 7 and 8 are schematic views of various arrangements of light lenses which may be used in combination with the electronic microscope.

Referring to Fig. 1, an envelope 1 is exhausted by a vacuum pump 3. Within the envelope are arranged: An electron-emitting element 5, deflector plates 7, diaphragms 9, a combined light objective and electronic lens 11, which will be more fully described hereinafter, a photographic plate holder 13, and a fluorescent screen 15. External to the envelope is arranged a flexible joint 17, which permits the initial centering of the cathode ray stream. The envelope also includes electronic lenses 19, 21. A suitable eyepiece 23 is arranged on the side of the envelope and a window 25 is arranged at the base of the envelope for viewing the fluorescent screen. The general arrangement of the foregoing elements is described in somewhat greater detail in the copending applications of Ladislaus Marton, Serial No. 243,747, filed December 3, 1938, entitled "Method of making electronic photomicrographs," and Serial No. 247,757, filed December 27, 1938, entitled "Electron lenses."

One suitable method for combining the light and electron lenses is shown in Fig. 2. First, the light lens system will be described. A structure 27 for housing an eyepiece is hermetically sealed to the envelope 29. The eyepiece 32, including suitable lenses 34, is arranged within an aperture 31. A source of light 33, which may be an electric light with an annular-shaped envelope, is located within the envelope. A mirror 35 is positioned at a suitable angle with respect to the eyepiece for reflecting the light on the objective lens 37. The objective lens may consist of the conventional arrangement of lenses 39, 41, 43 of different materials arranged to correct for aberrations. A small aperture 45 is located substantially at the center of the several lenses. The aperture is preferably lined with a metallic tube 47 or conductive coating of the surface of apertures. The tube or coating is connected to ground by means of a conductive coating transparent to light which is arranged on the surface of one of the lenses. The conducting coat is connected to the metallic elements of the electron lenses which will be hereinafter described. The function of the metallic tube which lines the apertures is to prevent an accumulation of electrons on the lens system which might diffuse the electron beam.

Opposite the last lens 43 of the light objective lens system is arranged a spherical reflector 48 which reflects the light through the specimen 49. The specimen is positioned at the center of curvature of the reflector. At this position the light from the objective lens system will be concentrated, after reflection, on the specimen with the full numerical aperture of the objective. The use of a spherical reflector for condensing the light at the specimen is not only a very effective method of illuminating the specimen but also saves space, which is at a premium in the region of the specimen. The image of the specimen passes through the lens system to the mirror 35 where it is viewed in the conventional manner. It will be noted that both the mirror 35 and the spherical reflector 48 include apertures 51, 53 through which the electron beam may be passed. While the spherical reflector is a preferred means for concentrating the light, other means may be employed. For example, Fig. 2a illustrates a portion of the lens system, in which the light reflector 54 is of frusto-conical shape. In this arrangement, the light source 56 is located near the reflector 54.

The light objective lenses are mounted on the magnetic pole piece structure which is arranged as follows: Within a hollow annulus 55 is positioned a magnetizing coil 57. The central inner portion of the annulus is threaded to take a circular pole piece 59. The lower portion of the annulus includes a second pole piece 61 which may be secured to the annulus by welding or any other suitable means. The pole pieces are of opposite polarity because the inner portion of the annulus includes a nonmagnetic separator 63. The pole pieces are maintained in proper spaced relation by the use of a nonmagnetic spacer 65 which may be threaded to the two pole pieces. The foregoing magnetic structure forms part of the electronic condenser lens system.

The objective portion of the electronic lens is composed of a second hollow annulus 67 which encloses a magnetizing coil 69. The inner portion of the annulus includes a nonmagnetic spacing ring 71. On the upper side of this spacing ring is arranged a circular pole piece 73 which supports the spherical reflector 47. A second pole piece 75 is arranged below the first-mentioned pole piece 73 and the spacing ring 71. It should be understood that both the first- and second-mentioned hollow annular structures are preferably made of a magnetizable material. It will be seen that the envelope 29 is secured to a coupling element 77 which includes a sealable aperture 79 through which the specimen is inserted. The coupling member 77 is connected by fittings 81, 83 which are bolted to the coupling member to compress rubber gaskets 85, 87 to thereby insure a vacuum-tight joint. In describing the foregoing arrangement, it should be understood that conventional methods are employed to connect the various parts so that the space within the envelope may be suitably evacuated as is well known to those skilled in the art.

The arrangement shown in Fig. 3 does not differ in its essentials from the lens system previously described. The advantage of the arrangement of Fig. 3 is that similar parts are used so that any required number of electron lenses may be assembled. Furthermore, it embodies the corrective lens described in the second copending application cited above. The pole pieces 91, 93, 95, 97 are fastened to the annular shells 99, 101, 103, 105, respectively, by threading or any other suitable means. The annular shells are arranged with lock joints 107 so that they may be nested within each other to thereby enclose the magnetizing coils 109. It should be understood that the pole pieces may be of any desired shape and that it is preferable to use one of the pole pieces to support a shell 110 housing the light objective lens 111 and another pole piece to support or include the spherical reflector 113. All of the light elements include apertures through which the electron beam is passed. The specimen 115 is inserted within the envelope through a suitable aperture which is not shown.

While one arrangement of the light source, light reflector and eyepiece has been shown in Figs. 1 and 2, it should be understood that other arrangements may be employed in connection with Figures 4 through 8 to which reference will now be made; similar reference numerals will indicate similar parts.

In Fig. 4, the eyepiece 117 is surrounded by the light source 119. The mirror 121 includes an aperture 123. The objective lens is represented by the block 125 and the specimen by the line 127. This arrangement is not essentially different from the arrangement illustrated in Fig. 2.

In Fig. 5, the light is arranged at a point more remote from the eyepiece and is reflected by half-silvered mirror 129. The balance of the arrangement is similar to Fig. 4.

In Fig. 6, the eyepiece is arranged so that the image of the specimen which is reflected by a mirror 131 is viewed through the aperture in the mirror 121 which reflects light from the source 119.

In Fig. 7, the light source is arranged above the mirror which is half-silvered and is remote from the eyepiece. The half-silvered mirror passes the light from the source to the objective lens and reflects the image of the specimen upon the eyepiece.

In Fig. 8, the light source and mirror are arranged as in Fig. 7 but, in order to obtain a longer distance from the specimen to the eyepiece, an additional mirror 131 is arranged as in Fig. 6.

Thus I have described a combined light and electronic microscope in which the specimen may be observed by passing an electron beam through the light objective lens system to the specimen and hence to a photographic plate or fluorescent screen. The aperture through the light objective system is protected by a metallic tube, film or the like to prevent damage by electron bombardment or the acquisition of an undesirable electric charge. Various arrangements of light systems may be employed to obtain the desired focal conditions. The light lenses are supported by the pole pieces of the electronic lens system. The aperture in the light lens has no detrimental effect on the image but a larger lens is required to compensate for the hole. It should be understood that an electrostatic lens system may be substituted for the magnetic lens.

I claim as my invention:

1. A combined light and electron microscope for imaging an object including, an electron-emitting source, means for condensing said electrons on said object, means for forming an electron optical image of said object, and means including a condenser for condensing light on said object for forming a light optical image of said object, said last two means being coaxially positioned with respect to each other and each being so positioned with respect to said object that a common focal point is formed for said last two means allowing simultaneous formation of an independent light optical image and an independent electron image each taken directly from said object.

2. A combined light and electronic microscope for imaging an object including, in combination, an electron-emitting source, means for condensing electrons from said source on said object, means for forming an electron optical image of said object, and means including a light source and a condenser for condensing light from said source on said object for forming a light optical image of said object, said last two means being so positioned with respect to said object that a common focal point is formed allowing simultaneous formation of an independent light optical image and an independent electron optical image each taken directly from said object.

3. A combined light and electronic microscope for imaging an object including, in combination, an electron-emitting source, means for condensing electrons from said source on said object, means for forming an electron optical image of said object, and means including a source of light and a condenser for condensing light from said source on said object for forming a light optical image of said object, at least one of said two condensing means and said two image-forming means being so positioned with respect to said object that a common focal point is formed for said microscopes allowing simultaneous formation of an independent light optical image and an independent electron optical image each taken directly from said object.

4. A light and electronic microscope for imaging simultaneously an object including an electron source, means for directing electrons from said source on said object, means for focusing the electrons leaving said object to form an electron optical image of said object, and means for forming a light optical image of said object, said last two means being so positioned with respect to said object that a common focal point is formed for said two means allowing simultaneous formation of an independent light optical image and an independent electron optical image each taken directly from said object.

5. A light and electronic microscope for imaging simultaneously an object including an electron source, means for directing electrons from said source on said object, means for focusing the electrons leaving said object to form an electron optical image of said object, and means for forming a light optical image of said object, said two image-forming means being so positioned with respect to said object that a common focal point is formed for imaging said object allowing simultaneous formation of an independent light optical image and an independent electron optical image each taken directly from said object.

6. A light and electronic microscope of the character of claim 4 including a source of light, means for directing said light on said object, said light directing means including an aperture through which the said electrons are directed to said object, and means located adjacent said aperture for discharging electrons reaching the walls of said aperture.

7. A light and electronic microscope of the character of claim 4 including a source of light, and means for directing light from said source on said object, said light directing means including an aperture through which said electrons are directed on said object.

LADISLAUS MARTON.